(12) United States Patent
Sharma et al.

(10) Patent No.: US 10,846,314 B2
(45) Date of Patent: Nov. 24, 2020

(54) METHOD AND SYSTEM FOR LOCATION CLUSTERING FOR TRANSPORTATION SERVICES

(71) Applicant: ANI TECHNOLOGIES PRIVATE LIMITED, Karnataka (IN)

(72) Inventors: Anand Sharma, Madhya Pradesh (IN); Rajesh Kumar Singh, Bokaro Steel (IN); Shailesh Kumar, Telangana (IN); Kunal Sachdeva, New Delhi (IN)

(73) Assignee: ANI Technologies Private Limited, Bangalore (IN)

( * ) Notice: Subject to any disclaimer, the term of this patent is extended or adjusted under 35 U.S.C. 154(b) by 344 days.

(21) Appl. No.: 15/915,949

(22) Filed: Mar. 8, 2018

(65) Prior Publication Data

US 2019/0197132 A1 Jun. 27, 2019

(51) Int. Cl.
*G06F 16/29* (2019.01)
*H04L 29/08* (2006.01)
*H04W 4/02* (2018.01)
*H04W 4/029* (2018.01)
(Continued)

(52) U.S. Cl.
CPC .............. *G06F 16/29* (2019.01); *H04L 67/18* (2013.01); *H04W 4/021* (2013.01); *H04W 4/023* (2013.01); *H04W 4/029* (2018.02); *H04W 4/40* (2018.02); *G06Q 2240/00* (2013.01)

(58) Field of Classification Search
CPC ... G06F 17/30241; G06F 16/29; H04L 67/18; H04W 4/023; H04W 4/029; H04W 4/40; H04W 4/021; G06Q 2240/00
See application file for complete search history.

(56) References Cited

U.S. PATENT DOCUMENTS 9,510,154 B2 11/2016 Mori et al.
9,769,616 B1* 9/2017 Pao .......................... H04W 4/44
(Continued)

FOREIGN PATENT DOCUMENTS

CN    105825672 A    8/2016

OTHER PUBLICATIONS https://web.archive.org/web/20150905165824/https://web.eecs.umich.edu/~dkoutra/papersVoG_journal.pdf.*
(Continued)

*Primary Examiner* — Rupangini Singh
(74) *Attorney, Agent, or Firm* — Chip Law Group

(57) ABSTRACT

A method and a system for location clustering for a transportation service are provided. A plurality of locations are clustered into a plurality of clusters, each having one or more locations of the plurality of locations. A graph is generated by connecting the plurality of clusters. A first cluster of the plurality of clusters is connected to one or more second clusters of the plurality of clusters that satisfy one or more threshold parameters. The graph is segmented into a plurality of fully-connected maximal sub-graphs based on one or more connections between the plurality of clusters. One or more fully-connected maximal sub-graphs of the plurality of fully-connected maximal sub-graphs have a set of common clusters. The plurality of fully-connected maximal sub-graphs are used for performing one or more transportation service operations of the transportation service.

20 Claims, 9 Drawing Sheets

(51) Int. Cl.
*H04W 4/021* (2018.01)
*H04W 4/40* (2018.01)

(56) References Cited

U.S. PATENT DOCUMENTS

| | | | |
|---|---|---|---|
| 2004/0015301 A1* | 1/2004 | Milik | G16B 15/00 702/27 |
| 2011/0306357 A1* | 12/2011 | Alizadeh-Shabdiz | G01S 5/0278 455/456.1 |
| 2013/0198191 A1* | 8/2013 | Lara Hernandez | G06F 16/285 707/737 |
| 2014/0222954 A1 | 8/2014 | Vaccari et al. | |
| 2017/0091342 A1* | 3/2017 | Sun | G06F 16/2379 |

OTHER PUBLICATIONS

Schaeffer S E. Survey Graph Clustering (2007) Computer Science Review pp. 27-64.*
Junming Zhang et al., "On Retrieving Moving Objects Gathering Patterns from Trajectory Data via Spatio-Temporal Graph", 2014 IEEE International Congress on Big Data, pp. 390-397.
Michael R. Fellows et al. "Graph-Based Data Clustering with Overlaps", Elsevier, Discrete Optimization, vol. 8, 2011, pp. 2-17.

* cited by examiner

METHOD AND SYSTEM FOR LOCATION CLUSTERING FOR TRANSPORTATION SERVICES

CROSS-RELATED APPLICATIONS

This application claims priority of Indian Application Serial No. 201741046778, filed Dec. 27, 2017, the contents of which are incorporated herein by reference.

FIELD OF THE INVENTION

The present invention relates generally to transportation services, and more particularly, to a method and system for location clustering for transportation services.

BACKGROUND

Recent developments in the field of transportation services have led to an evolution of various online platforms that cater to travelling requirements of commuters. Specifically, transportation services that offer on-demand vehicle services to the commuters have emerged as a popular solution to overcome the ever-increasing demand for transportation services. Usually, such transportation services are managed by well-established transportation service providers, who deploy transportation service vehicles along various routes.

The commuters raise transportation service requests for availing the transportation services to commute from a pick-up location to a drop-off location. Transportation service systems process such transportation service requests and allocate transportation service vehicles to serve the transportation service requests of the commuters. For allocating a transportation service vehicle to a commuter, a transportation service system has to match an available transportation service vehicle to the commuter. The matching of the available transportation service vehicle involves real-time location tracking and identification of available transportation service vehicles and the commuters.

Typically, the transportation service systems process the real-time locations and the pick-up locations at geographical coordinate level, i.e., at latitude-longitude coordinate level. As the popularity of the on-demand vehicle services is increasing, the transportation service providers are deploying more transportation service vehicles. With an increase in the number of transportation service requests and transportation service vehicles deployed, processing overhead of the transportation service systems also increases.

A known solution to cater to the increasing processing overhead of the transportation service systems involves clustering of the latitude-longitude coordinates into multiple clusters. Each cluster has different locations. Thus, the transportation service systems have to process the transportation service requests and the real-time locations of the transportation service vehicles at cluster level rather than at the latitude-longitude coordinate level. Although the processing of the transportation service requests and the real-time locations of the transportation service vehicles at cluster level reduces the processing overhead of the transportation service systems, it puts a hard boundary on allocation of the transportation service vehicles. For example, an available transportation service vehicle may be very near to a commuter who raised a transportation service request, but it may not be allocated to the commuter unless the transportation service vehicle and the commuter are in the same cluster. Thus, the clustering of the latitude-longitude coordinates into the clusters offers a static solution to the problem at hand, which may not be dynamically adaptable.

In light of the foregoing, there exists a need for a solution that solves the above-mentioned problems and provides a dynamically adaptable solution that not only reduces the processing overhead of the transportation service systems but also optimizes transportation service vehicle allocation.

SUMMARY

In an embodiment of the present invention, a method and system of location clustering for a transportation service are provided. A plurality of locations of a geographical area are clustered into a plurality of clusters based on one or more clustering parameters by circuitry of the system. Each cluster of the plurality of clusters includes one or more locations of the plurality of locations. A graph is generated by connecting the plurality of clusters based on one or more threshold parameters. A first cluster of the plurality of clusters is connected to one or more second clusters of the plurality of clusters that satisfy the one or more threshold parameters. The graph is segmented into a plurality of fully-connected maximal sub-graphs based on one or more connections between the plurality of clusters of the graph. Each fully-connected maximal sub-graph of the plurality of fully-connected maximal sub-graphs includes a set of clusters of the plurality of clusters. Each cluster in the set of clusters is connected to remaining clusters in the set of clusters. The set of clusters of a first fully-connected maximal sub-graph and the set of clusters of a second fully-connected maximal sub-graph have a set of common clusters therebetween. The plurality of fully-connected maximal sub-graphs are stored in a storage server for performing one or more transportation service operations of the transportation service.

Various embodiments of the present invention provide methods and systems for location clustering for a transportation service. The system receives location information pertaining to a plurality of locations associated with a geographical area. The locations include pick-up and drop-off locations of a plurality of commuters. The locations are clustered into a plurality of clusters based on one more clustering parameters, such as a clustering distance parameter. Locations having a distance less than or equal to the clustering distance parameter therebetween, are included in a same cluster. Thus, each cluster of the plurality of clusters includes one or more locations of the plurality of locations. In an embodiment, if a first location is not within the clustering distance parameter of any other location, the system includes the first location in a cluster. Thus, the cluster includes one location (i.e., the first location). The plurality of clusters are connected based on one or more threshold parameters to generate a graph. The one or more threshold parameters include distance and travel time thresholds. For example, a first cluster of the plurality of clusters is connected to one or more second clusters of the plurality of clusters that satisfy the one or more threshold parameters. The graph is then segmented into a plurality of fully-connected maximal sub-graphs based on one or more connections between the plurality of clusters of the graph. Each fully-connected maximal sub-graph includes a set of clusters of the plurality of clusters, such that each cluster in the set of clusters is connected to remaining clusters in the set of clusters. Further, one or more fully-connected maximal sub-graphs have one or more clusters in common. For example, the set of clusters of a first fully-connected maximal sub-graph and the set of clusters of a second fully-connected maximal sub-graph have a set of common clusters therebetween. Information pertaining to the plurality of fully-connected maximal sub-graphs is stored in a storage server and is used to perform one or more transportation service operations, such as transportation service vehicle allocation, associated with the transportation service.

The one or more connections among the plurality of clusters of the graph are based on distance and travel time thresholds, which make the one or more connections dynamically adaptable. Since the plurality of fully-connected maximal sub-graphs are generated based on the one or more connections among the plurality of clusters, the plurality of fully-connected maximal sub-graphs are also dynamically adaptable. The utilization of the plurality of fully-connected maximal sub-graphs for performing the one or more transportation service operations reduces the processing overhead of the system as compared to the processing overhead involved in using the latitude-longitude coordinates. Further, the one or more fully-connected maximal sub-graphs have common clusters among them, which eliminates the hard boundaries on allocation of the transportation service vehicles, thereby optimizing the transportation service vehicle allocation.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
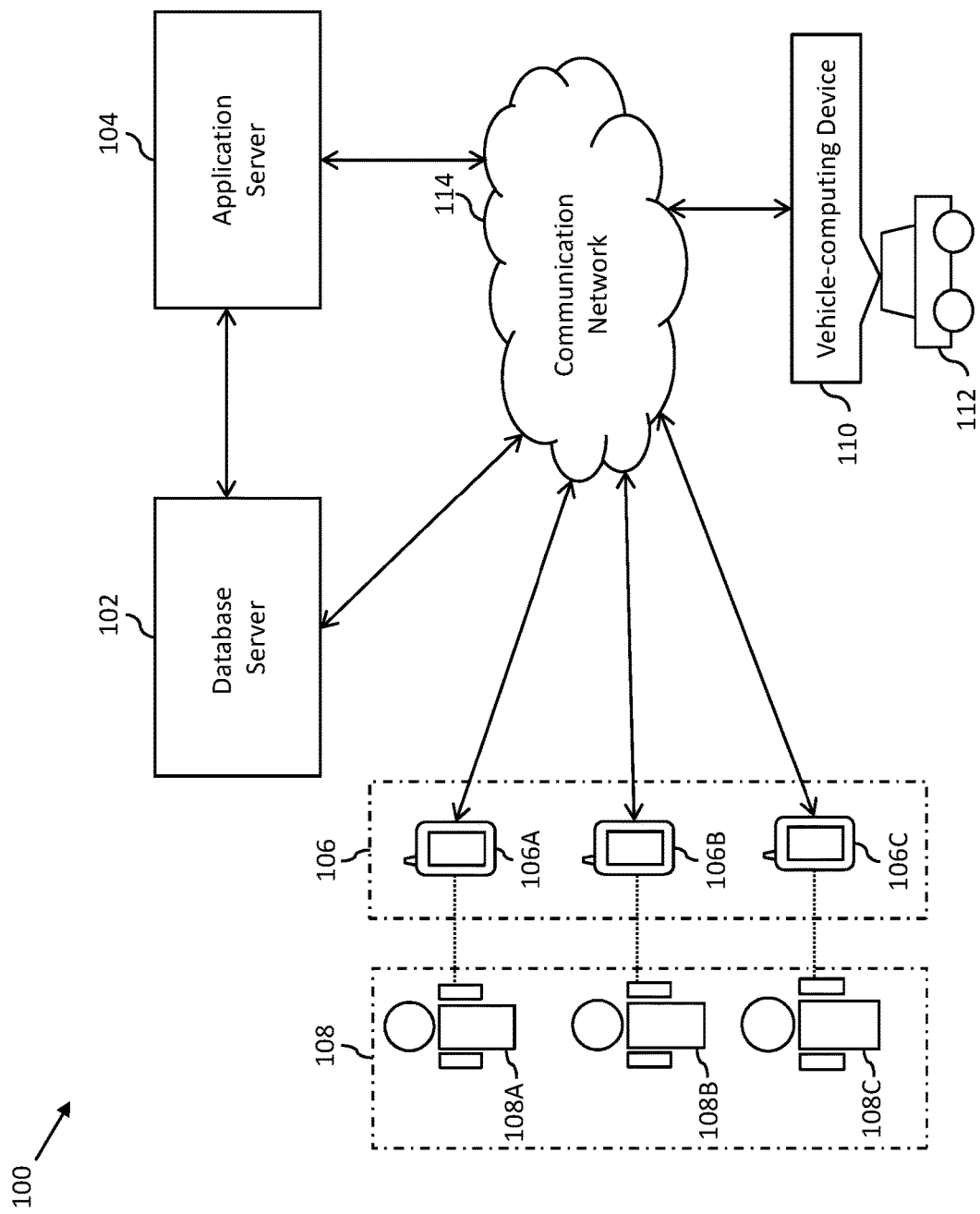
FIG. 1 is a block diagram that illustrates an environment in which various embodiments of the present invention are practiced.

Further areas of applicability of the present invention will become apparent from the detailed description provided hereinafter. It should be understood that the detailed description of exemplary embodiments are intended for illustration purposes only and are, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes a system for location clustering for a transportation service. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Referring now to FIG. 1, a block diagram that illustrates an environment 100 in which various embodiments of the present invention are practiced is shown. The environment 100 includes a database server 102, an application server 104, and a plurality of commuter-computing devices 106

(hereinafter referred to as "commuter-computing devices 106"). In one example, the commuter-computing devices 106 include first through third commuter-computing devices 106A-106C. The commuter-computing devices 106 are associated with a plurality of commuters 108 (hereinafter referred to as "commuters 108"), respectively. In one example, the commuters 108 include first through third commuters 108A-108C. The environment 100 further includes a vehicle-computing device 110 that is associated with a transportation service vehicle 112 (hereinafter a transportation service vehicle is referred to as "a vehicle") of a transportation service. The database server 102, the commuter-computing devices 106, and the vehicle-computing device 110 communicate with the application server 104 by way of a communication network 114. It will be apparent to a person having ordinary skill in the art that the disclosed embodiments may be implemented by using multiple commuter-computing devices and multiple vehicle-computing devices, without departing from the scope of the invention.

The database server 102 is a computing device that is communicatively coupled to the communication network 114. The database server 102 performs one or more database operations, such as receiving, storing, processing, and transmitting queries, data, or content. The queries, data, or content is received/transmitted from/to various components of the environment 100. The database server 102 stores historical travel data of the commuters 108. The historical travel data includes location information pertaining to a plurality of locations (hereinafter referred to as "the locations") that are traveled by the commuters 108. The locations are associated with a geographical area. In one example, the locations represent pick-up and drop-off locations of the commuters 108. Each location is a unique combination of longitude and latitude coordinates. The location information may be stored in form of geographical map data. The database server 102 updates the historical travel data of the commuters 108 based on travel details of the commuters 108. The database server 102 may receive the travel details of the commuters 108 from the commuter-computing devices 106, respectively. For querying the database server 102, various querying languages, such as, but not limited to, SQL®, QUEL®, and DMX®, are utilized. The database server 102 is realized through various technologies such as, but not limited to, Microsoft® SQL Server, Oracle®, IBM DB2®, Microsoft Access®, PostgreSQL®, MySQL® and SQLite®.

The application server 104 is an electronic device, a computing device, or a software framework hosting an application or a software service that may be communicatively coupled to the communication network 114. The application server 104 receives the location information of the commuters 108. The application server 104 processes the location information and clusters the locations included in the location information to generate a plurality of clusters. The application server 104 implements various algorithms, such as density based spatial clustering algorithm, to cluster the locations. The application server 104 further generates a graph by connecting the plurality of clusters based on one or more threshold parameters. The application server 104 segments the graph to generate a plurality of fully-connected maximal sub-graphs (hereinafter "a fully-connected maximal sub-graph" is referred to as "a sub-graph") based on one or more connections among the plurality of clusters of the graph. The application server 104 performs one or more transportation service operations by using the plurality of sub-graphs. In one example a transportation service system (not shown) may be implemented by way of the application server 104. The application server 104 is realized through various types of framework servers, such as, but not limited to, a Java framework server, a .NET framework server, a Base4 application server, a PHP framework server, or any other framework server. The elements of the application server 104 are explained in detail in conjunction with FIG. 2.

It will be apparent to a person having ordinary skill in the art that the scope of the invention is not limited to realizing the database server 102 and the application server 104 as separate entities. In an embodiment, the functionalities of the database server 102 can be integrated into the application server 104, without departing from the spirit of the invention. Further, in an embodiment, the application server 104 may be realized as an application program installed on and/or running on the vehicle-computing device 110 and/or the commuter-computing devices 106, without departing from the spirit of the invention.

The commuter-computing devices 106 are computing devices that are communicatively coupled to the communication network 114. The commuters 108 utilize the corresponding commuter-computing devices 106 to raise transportation service requests for travelling between a corresponding pick-up location and a corresponding drop-off location. For example, the first commuter 108A raises a transportation service request by using the first commuter-computing device 106A to travel from a first pick-up location to a first drop-off location. The commuter-computing devices 106 transmit the transportation service requests to the application server 104. In one embodiment, each of the commuter-computing devices 106 includes a navigation device, such as a global positioning system (GPS), for tracking a real-time location of the corresponding commuters 108. The commuter-computing devices 106 further transmit the tracked real-time locations of the commuters 108, respectively, to the database server 102 and the application server 104.

The vehicle-computing device 110 is a computing device that is communicatively coupled to the communication network 114. The vehicle-computing device 110 is installed in the vehicle 112. The vehicle 112 is a means of transport that is deployed by a transportation service provider to provide transportation services to the commuters 108. Examples of the vehicle 112 include an automobile, a bus, and the like. The commuters 108 may travel in the vehicle 112 to commute from the corresponding pick-up location to the corresponding drop-off location. In one embodiment, the vehicle-computing device 110 includes a navigation device, such as a GPS, for tracking a real-time location of the vehicle 112. The vehicle-computing device 110 further transmits the tracked real-time locations of the vehicle 112 to the database server 102 and the application server 104.

Examples of the commuter-computing devices 106 and the vehicle-computing device 110 include, but are not limited to, a mobile phone, a smartphone, a tablet, a phablet, a laptop, or any other portable communication device.

The communication network 114 is a medium through which content and messages are transmitted between various devices, such as the database server 102, the application server 104, the commuter-computing devices 106, and the vehicle-computing device 110. Examples of the communication network 114 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a mobile network such as cellular data, high speed packet access (HSPA), or any combination thereof. Various devices in the environment 100 may connect to the communication network 114 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G) communication protocols, Long Term Evolution (LTE) communication protocols, or any combination thereof.

Figure 2:
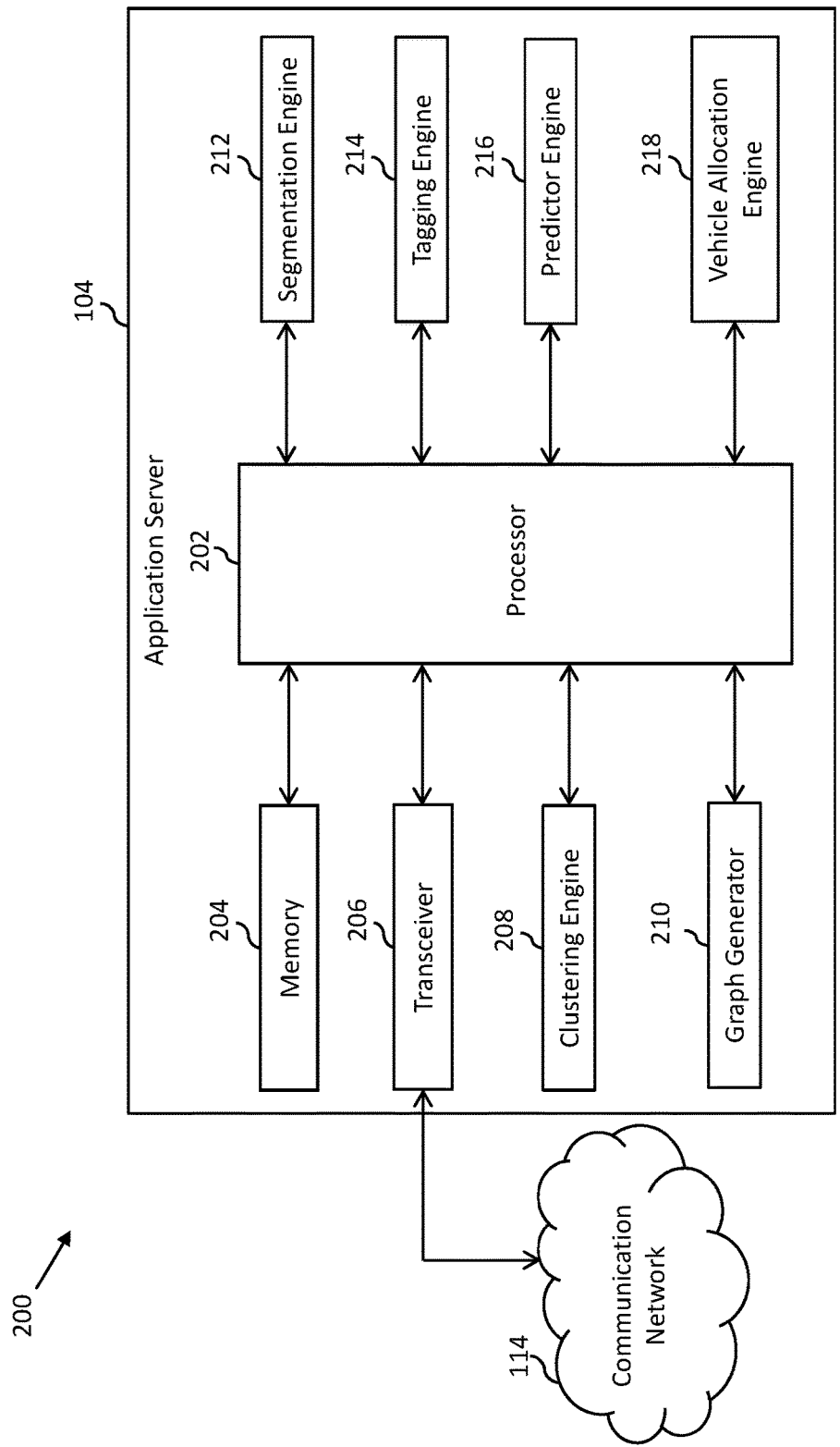
FIG. 2 is block diagram that illustrates an application server of the environment of FIG. 1, in accordance with an embodiment of the present invention.

Referring now to FIG. 2, a block diagram that illustrates the application server 104 of the environment 100 of FIG. 1, in accordance with an embodiment of the present invention, is shown. The application server 104 includes a processor 202, a memory 204, a transceiver 206, a clustering engine 208, a graph generator 210, a segmentation engine 212, a tagging engine 214, a predictor engine 216, and a vehicle allocation engine 218.

The processor 202 includes suitable logic, circuitry, and/or interfaces to execute instructions, programs, codes, and/or scripts stored in the memory 204. The processor 202 communicates with the database server 102, the commuter-computing devices 106, and the vehicle-computing device 110 by way of the transceiver 206. The processor 202 transmits queries to the database server 102 for retrieving the location information of the commuters 108. The processor 202 further receives and processes the transportation service requests of the commuters 108 for the allocation of an available vehicle, such as the vehicle 112. The processor 202 is implemented based on a number of processor technologies known in the art. It will be apparent to a person skilled in the art that the processor 202 is compatible with multiple operating systems.

The memory 204 includes suitable logic, circuitry, and/or interfaces that store the instructions, programs, codes, and/or scripts executable by the processor 202, the transceiver 206, the clustering engine 208, the graph generator 210, the segmentation engine 212, the tagging engine 214, the predictor engine 216, and/or the vehicle allocation engine 218. The memory 204 stores the transportation service requests of the commuters 108. The memory 204 further stores the algorithms, such as the density based spatial clustering algorithm, and the like, which enable the processor 202, the clustering engine 208, the graph generator 210, the segmentation engine 212, the tagging engine 214, the predictor engine 216, and/or the vehicle allocation engine 218 to perform various transportation service operations. Examples of the memory 204 include, but are not limited to, a random access memory (RAM), a read only memory (ROM), a hard disk drive (HDD), and a secure digital (SD) card.

The transceiver 206 transmits and receives messages and data over the communication network 114 via one or more communication network protocols. The transceiver 206 receives the transportation service requests of the commuters 108 from the commuter-computing devices 106, respectively. The transceiver 206 further receives the location information of the commuters 108 from the database server 102 and the commuter-computing devices 106. The transceiver 206 further receives the tracked real-time location of the vehicle 112 from the vehicle-computing device 110. Examples of the transceiver 206 include, but are not limited to, an antenna, a radio frequency transceiver, a wireless transceiver, a Bluetooth transceiver, an ethernet port, a universal serial bus (USB) port, or any other device configured to transmit and receive data.

The clustering engine 208 includes suitable logic, circuitry, and/or interfaces to execute instructions, programs, codes, and/or scripts stored in the memory 204. The clustering engine 208 generates the plurality of clusters by clustering the locations included in the location information. The clustering engine 208 may use the density based spatial clustering algorithm stored in the memory 204 for clustering the locations.

The graph generator 210 includes suitable logic, circuitry, and/or interfaces to execute instructions, programs, codes, and/or scripts stored in the memory 204. The graph generator 210 connects the plurality of clusters based on the one or more threshold parameters, such as distance and travel time thresholds, for generating the graph. For example, the graph generator 210 connects a first cluster of the plurality of clusters to one or more second clusters of the plurality of clusters that satisfy the distance and travel time thresholds. Thus, based on the distance and travel time thresholds, the plurality of clusters have one or more connections therebetween. The graph generator 210 further updates the graph based on updates in the distance and travel time thresholds.

The segmentation engine 212 includes suitable logic, circuitry, and/or interfaces to execute instructions, programs, codes, and/or scripts stored in the memory 204. The segmentation engine 212 segments the graph based on the one or more connections between the plurality of clusters to generate the plurality of sub-graphs. Each sub-graph includes a set of clusters of the plurality of clusters. For example, a first sub-graph includes a first set of clusters and a second sub-graph includes a second set of clusters. In one embodiment, the first set of clusters of the first sub-graph and the second set of clusters of the second sub-graph may have one or more clusters in common. In another embodiment, the first set of clusters of the first sub-graph and the second set of clusters of the second sub-graph may not have any clusters in common. In other words, the plurality of sub-graphs have sets of common clusters therebetween.

The tagging engine 214 includes suitable logic, circuitry, and/or interfaces to execute instructions, programs, codes, and/or scripts stored in the memory 204. The tagging engine 214 tags each sub-graph based on a cluster type of each cluster included in the set of clusters of the corresponding sub-graph. For example, the tagging engine 214 tags the first sub-graph based on a cluster type of each cluster included in the first set of clusters. Examples of the cluster type include a residential cluster type, a commercial cluster type, a transit point cluster type, or a public cluster type.

The predictor engine 216 includes suitable logic, circuitry, and/or interfaces to execute instructions, programs, codes, and/or scripts stored in the memory 204. The predictor engine 216 predicts a demand for vehicles, such as the vehicle 112, originating from the plurality of sub-graphs. The predictor engine 216 further predicts an availability of vehicles in the plurality of sub-graphs to meet the predicted demand. The predictor engine 216 may use various demand and supply forecasting algorithms known in the art to predict the demand and availability for/of the vehicles.

The vehicle allocation engine 218 includes suitable logic, circuitry, and/or interfaces to execute instructions, programs, codes, and/or scripts stored in the memory 204. The vehicle allocation engine 218 allocates the available vehicles, such as the vehicle 112, to serve the transportation service requests of the commuters 108. The vehicle allocation engine 218 may use various ride-matching algorithms to allocate the vehicle 112.

The processor 202, the clustering engine 208, the graph generator 210, the segmentation engine 212, the tagging engine 214, the predictor engine 216, and the vehicle allocation engine 218 are realized through various electronic components, such as, but not limited to, a system on chip (SoC) component, an application-specific integrated circuit (ASIC) processor, a reduced instruction set computing (RISC) processor, a complex instruction set computing (CISC) processor, or a field-programmable gate array (FPGA) processor.

It will be apparent to a person skilled in the art that the scope of the invention is not limited to realize the clustering engine 208, the graph generator 210, the segmentation engine 212, the tagging engine 214, the predictor engine 216, and the vehicle allocation engine 218 as separate entities. In another embodiment, the clustering engine 208, the graph generator 210, the segmentation engine 212, the tagging engine 214, the predictor engine 216, and the vehicle allocation engine 218 may be implemented within the processor 202, without departing from the spirit of the invention. In yet another embodiment, the functionalities of the clustering engine 208, the graph generator 210, the segmentation engine 212, the tagging engine 214, the predictor engine 216, and the vehicle allocation engine 218 can be integrated into the processor 202. The functioning of the elements of the application server 104 is explained in detail in conjunction with FIGS. 3A-3C.

Figure 3A:
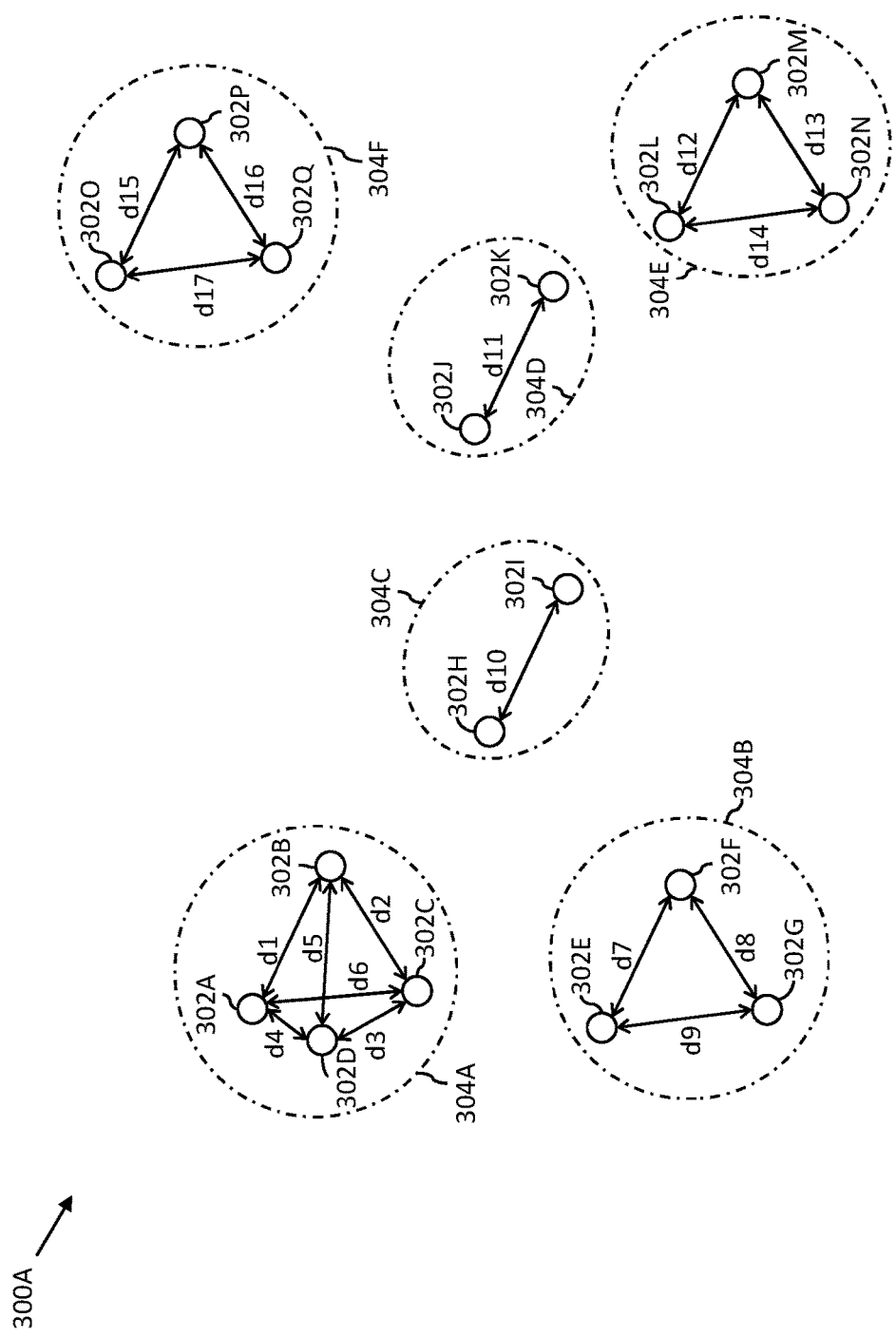
FIG. 3A is a block diagram of an exemplary scenario that illustrates clustering of a plurality of locations, in accordance with an embodiment of the present invention.

Referring now to FIG. 3A, a block diagram of an exemplary scenario 300A that illustrates clustering of a plurality of locations, in accordance with an embodiment of the present invention, is shown. The exemplary scenario 300A depicts first through seventeenth locations 302A-302Q. The first through seventeenth locations 302A-302Q are the pick-up and drop-off locations of the commuters 108. For the sake of simplicity, the exemplary scenario 300A depicts seventeen locations. However it will be apparent to a person having ordinary skill in the art that the count of locations is not limited to seventeen.

The database server 102 stores the location information pertaining to the first through seventeenth locations 302A-302Q. In one embodiment, the location information may be stored in the database server 102 when the commuters 108 raise the transportation service requests by using the corresponding commuter-computing devices 106, respectively, to fulfill their commutation demands. For example, the first commuter 108A may have raised a transportation service request to travel from the first location 302A (i.e., the pick-up location) to the fourth location 302D (i.e., the drop-off location) by using the first commuter-computing device 106A. When the first commuter 108A raises the transportation service request to fulfill his/her commutation demand, the first commuter-computing device 106A transmits the information pertaining to the pick-up and drop-off locations (i.e., the first and fourth locations 302A and 302D) to the database server 102. The database server 102 then updates the historical travel data of the first commuter 108A by including the first and fourth locations 302A and 302D. In a scenario, when the historical travel data of the first commuter 108A already includes the first and fourth locations 302A and 302D, the database server 102 may not update the historical travel data of the first commuter 108A.

In one embodiment, the transceiver 206 receives the location information pertaining to the first through seventeenth locations 302A-302Q from the database server 102, via the communication network 114. In another embodiment, the transceiver 206 receives the location information directly from the commuter-computing devices 106, when the commuters 108, respectively, raise the transportation service requests. The transceiver 206 then provides the location information to the processor 202. The processor 202 stores the location information in the memory 204 for further processing.

The clustering engine 208 receives the location information from the processor 202. The clustering engine 208 determines a distance between each of the first through seventeenth locations 302A-302Q. The clustering engine 208 may use one or more shortest route computation algorithms, such as Dijkstra's algorithm, to determine the distance between each of the first through seventeenth locations 302A-302Q.

The clustering engine 208 then clusters the first through seventeenth locations 302A-302Q based on the one or more clustering parameters. The one or more clustering parameters include a clustering distance parameter. In one example, the clustering distance parameter is 500 meters (m). In one embodiment, the clustering distance parameter is defined by the transportation service provider. In another embodiment, the clustering distance parameter is pre-defined for a type of transportation service. For example, for a taxi transportation service the clustering distance parameter is pre-defined to be 500 m and for an ambulance transportation service the clustering distance parameter is pre-defined to be 1 km. The clustering engine 208 clusters the first through seventeenth locations 302A-302Q locations by executing the density based spatial clustering algorithm stored in the memory 204.

The clustering engine 208 clusters one or more locations of the first through seventeenth locations 302A-302Q in one cluster, when the distance among the one or more locations is less than or equal to the clustering distance parameter (i.e., 500 m). For example, the clustering engine 208 determines that the distance between the first location 302A and the second location 302B is 350 m and the distance between the first location 302A and the fifth location 302E is 700 m. In such a scenario, the clustering engine 208 clusters the first location 302A and the second location 302B in one cluster, and the fifth location 302E in another cluster. In one embodiment, if the clustering engine 208 identifies one location that is not within the clustering distance parameter of any other location, the clustering engine 208 includes the one location in a cluster. Table 1, as shown below, illustrates first through sixth clusters 304A-304F formed by the clustering engine 208 based on the distances among the first through seventeenth locations 302A-302Q, when the clustering distance parameter is 500 m:

TABLE 1

List of clusters formed by the clustering engine 208

| Plurality of clusters | One or more locations in each cluster | Distances among the one or more locations in each cluster |
| --- | --- | --- |
| First cluster 304A | First through fourth locations 302A-302D | d1 = 350 m, d2 = 467 m, d3 = 432 m, d4 = 200 m, d5 = 400 m, and d6 = 410 m |
| Second cluster 304B | Fifth through seventh locations 302E-302G | d7 = 456 m, d8 = 432 m, and d9 = 489 m |
| Third cluster 304C | Eighth and ninth locations 302H and 302I | d10 = 450 m |
| Fourth cluster 304D | Tenth and eleventh locations 302J and 302K | d11 = 423 m |
| Fifth cluster 304E | Twelfth through fourteenth locations 302L-302N | d12 = 324 m, d13 = 435 m, and d14 = 424 m |

TABLE 1-continued

List of clusters formed by the clustering engine 208

| Plurality of clusters | One or more locations in each cluster | Distances among the one or more locations in each cluster |
|---|---|---|
| Sixth cluster 304F | Fifteenth through seventeenth locations 302O-302Q | d15 = 412 m, d16 = 216 m, and d17 = 328 m |

In accordance with Table 1, the first cluster 304A includes the first through fourth locations 302A-302D, the second cluster 304B includes the fifth through seventh locations 302E-302G, and the third cluster 304C includes the eighth and ninth locations 302H and 302I. Further, the fourth cluster 304D includes the tenth and eleventh locations 302J and 302K, the fifth cluster 304E includes the twelfth through fourteenth locations 302L-302N, and the sixth cluster 304F includes the fifteenth through seventeenth locations 302O-302Q. Each of the first through sixth clusters 304A-304F includes different locations.

In one embodiment, the clustering engine 208 further determines a centroid for each of the first through sixth clusters 304A-304F. In one embodiment, the centroid is a geographical center of the corresponding cluster. For example, the centroid of the first cluster 304A is the geographical center of the first cluster 304A. In another embodiment, the centroid is one of the locations included in the corresponding cluster. For example, the first location 302A is the centroid of the first cluster 304A.

The clustering engine 208 further identifies a cluster type for each of the first through sixth clusters 304A-304F based on one or more location tags associated with the one or more locations of each cluster. Examples of the cluster types include residential cluster type, official cluster type, a public cluster type, a transit point cluster type, a commercial cluster type, and the like. A location tag represents a label assigned to a location. In one embodiment, the location tag may be assigned to a location by a commuter and/or a transportation service provider. For example, the first commuter 108A may label the first location 302A as 'home' and the fifth location 302E as 'work'. Similarly, the transportation service provider may label the second location 302B as 'taxi pick-up point'. In another embodiment, the location tag may be assigned to a location based on a public utility of the location. For example, the seventh location 302G may have a label 'bus-stop', as the seventh location 302G is a fixed bus stop for bus services. In one embodiment, the clustering engine 208 may retrieve the location tags associated with the first through seventeenth locations 302A-302Q from the database server 102. In another embodiment, the clustering engine 208 may retrieve the location tags associated with the first through seventeenth locations 302A-302Q from the commuter-computing devices 106. In yet another embodiment, the clustering engine 208 may retrieve the location tags associated with the first through seventeenth locations 302A-302Q from internet and/or one or more external sources by way of the communication network 114. The clustering engine 208 determines the cluster type for the first through sixth clusters 304A-304F based on a weighted sum of the location tags associated with the one or more locations in the corresponding cluster. In one example, the first cluster 304A has the first through third locations 302A-302C with the location tag as 'home' and the fourth location 302D with the location tag as 'bus-stop'. In such a scenario, the clustering engine 208 determines that the first cluster 304A is of the residential cluster type as a majority of the locations in the first cluster 304A have the tag 'home'. In another example, the first through third locations 302A-302C of the first cluster 304A has the location tag 'taxi-pick up point' and the fourth location 302D has the location tag 'bus-stop'. In such a scenario, the clustering engine 208 determines that the first cluster 304A is of the transit point cluster type as a majority of the locations in the first cluster 304A have the tag 'taxi-pick up point'.

It will be apparent to a person skilled in the art that the abovementioned example is for illustrative purpose and should not be construed to limit the scope of the invention. In another embodiment, the clustering engine 208 may utilize one or more other techniques known in the art to determine the cluster type for each of the first through sixth clusters 304A-304F.

Figure 3B:
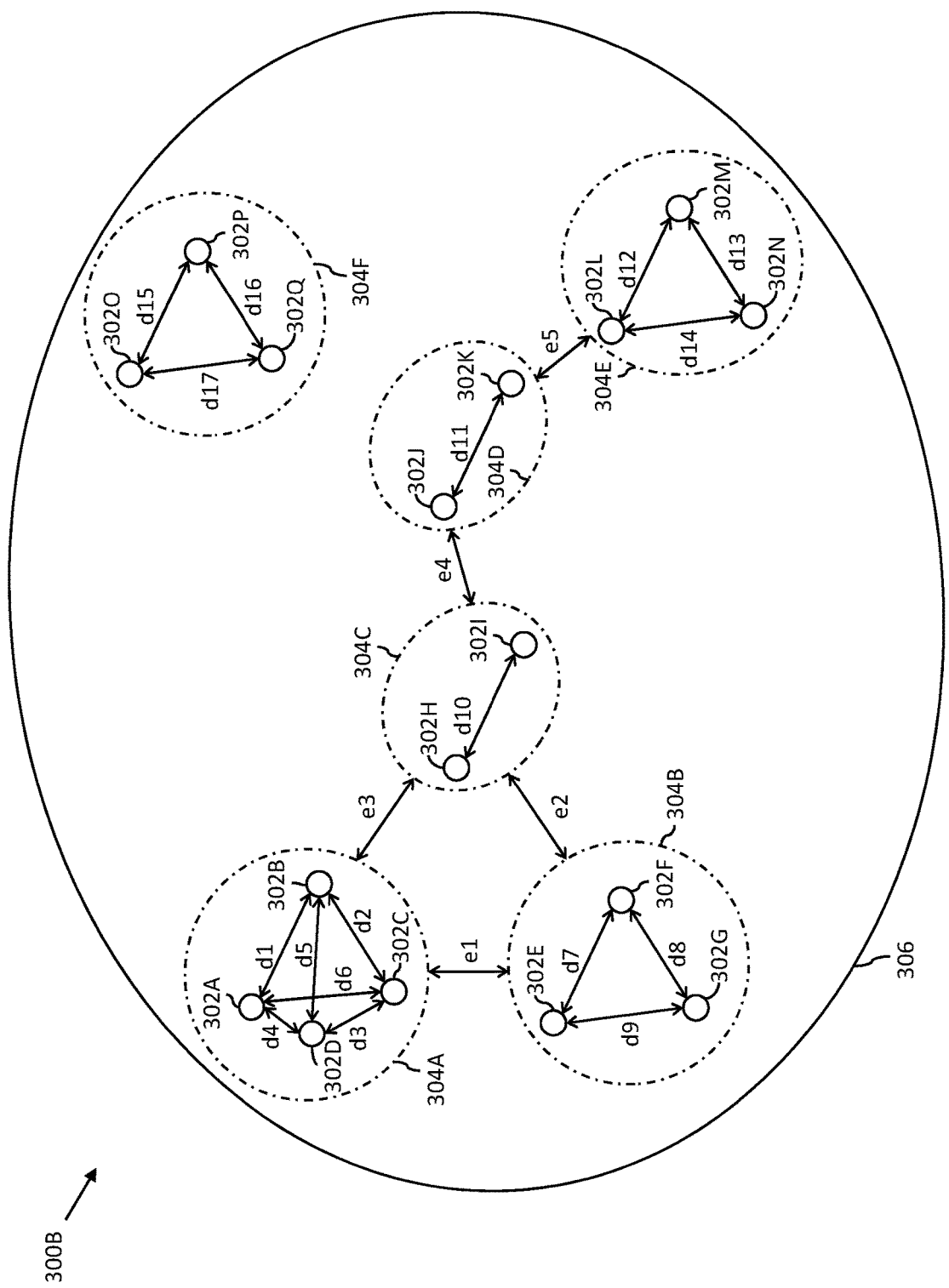
FIG. 3B is a block diagram of an exemplary scenario that illustrates generation of a graph based on a plurality of clusters of FIG. 3A in accordance with an embodiment of the present invention.

Referring now to FIG. 3B, a block diagram of an exemplary scenario 300B that illustrates generation of a graph 306 based on the plurality of clusters, i.e., the first through sixth clusters 304A-304F, of FIG. 3A, in accordance with an embodiment of the present invention, is shown.

The graph generator 210 receives information pertaining to the first through sixth clusters 304A-304F from the clustering engine 208. The graph generator 210 generates the graph 306 by utilizing the first through sixth clusters 304A-304F. The first through sixth clusters 304A-304F represent first through sixth nodes of the graph 306. For generating the graph 306, the graph generator 210 forms the one or more connections among the first through sixth clusters 304A-304F based on the one or more threshold parameters. The one or more connections among the first through sixth clusters 304A-304F are represented by one or more edges, such as first through fifth edges e1-e5, of the graph 306. The one or more threshold parameters include the distance and travel time thresholds. The one or more threshold parameters may be pre-defined by the transportation service provider. A cluster of the first through sixth clusters 304A-304F is connected to another cluster of the first through sixth clusters 304A-304F that satisfies the distance and travel time thresholds. The distance threshold represents a maximum permissible distance for connecting any two clusters of the first through sixth clusters 304A-304F. For example, when the distance threshold is 1 km, the graph generator 210 may connect two clusters by an edge if the two clusters are within 1 km of each other. The travel time threshold represents a maximum permissible travel time for connecting any two clusters of the first through sixth clusters 304A-304F. For example, when the travel time threshold is 1 hour, the graph generator 210 may connect two clusters by an edge if the two clusters are reachable from one another within 1 hour.

For connecting the first through sixth clusters 304A-304F, the graph generator 210 determines a travel distance and a travel time among the first through sixth clusters 304A-304F. In one embodiment, the graph generator 210 determines the travel distance and travel time among the centroids of the first through sixth clusters 304A-304F. In another embodiment, the graph generator 210 determines the travel distance and travel time among the nearest locations of the first through sixth clusters 304A-304F. Table 2, as shown below, illustrates the travel distance and travel time among the first through sixth clusters 304A-304F as determined by the graph generator 210:

TABLE 2

Travel distance and travel time among the plurality of clusters

| Cluster combination | Travel distance | Travel time |
| --- | --- | --- |
| The first and second clusters 304A and 304B | 800 m | 15 minutes |
| The first and third clusters 304A and 304C | 700 m | 12 minutes |
| The first and fourth clusters 304A and 304D | 1.2 km | 35 minutes |
| The first and fifth clusters 304A and 304E | 1.7 km | 40 minutes |
| The first and sixth clusters 304A and 304F | 2 km | 45 minutes |
| The second and third clusters304B and 304C | 750 m | 20 minutes |
| The second and fourth clusters 304B and 304D | 1.5 km | 35 minutes |
| The second and fifth clusters 304B and 304E | 1.3 km | 40 minutes |
| The second and sixth clusters 304B and 304F | 1.7 km | 45 minutes |
| The third and fourth clusters 304C and 304D | 600 m | 15 minutes |
| The third and fifth clusters 304C and 304E | 1.1 km | 35 minutes |
| The third and sixth clusters 304C and 304F | 1.2 km | 40 minutes |
| The fourth and fifth clusters 304D and 304E | 400 m | 10 minutes |
| The fourth and sixth clusters 304D and 304F | 2.1 km | 27 minutes |
| The fifth and sixth clusters 304E and 304F | 900 m | 35 minutes |

Based on the determined travel distance and travel time, the graph generator 210 identifies the clusters among the first through sixth clusters 304A-304F that satisfy the distance and travel time thresholds for forming the one or more connections. In one exemplary scenario, the distance and travel time thresholds are 2 km and 30 minutes, respectively. In accordance with Table 2, the graph generator 210 connects the first and second clusters 304A and 304B with the first edge e1 as the travel distance (i.e., 800 m) and travel time (i.e., 15 minutes) satisfy the distance and travel time thresholds, respectively. Similarly, the graph generator 210 connects the second and third clusters 304B and 304C, the first and third clusters 304A and 304C, the third and fourth clusters 304C and 304D, and the fourth and fifth clusters 304D and 304E with the second through fifth edges e2-e5. The graph generator 210 does not connect the fifth and sixth clusters 304E and 304F as the travel time (i.e., 35 minutes) is greater than the travel time threshold even though the travel distance (i.e., 900 m) is less than the distance threshold. Similarly, the graph generator 210 does not connect the first cluster 304A to the fourth through sixth clusters 304D-304F, the second cluster 304B to the fourth through sixth clusters 304D-304F, the third cluster 304C to the fifth and sixth clusters 304E and 304F, and the fourth cluster 304D to the sixth cluster 304F. As shown in FIG. 3B, the sixth cluster 304F is not connected to any other cluster, as the sixth clusters 304F is not within the distance and travel time thresholds of any other cluster.

In one embodiment, the graph generator 210 updates the graph 306 based on one or more updates in the distance and travel time thresholds. For example, the transportation service provider may modify the travel time threshold from 30 minutes to 45 minutes, in this scenario, the graph generator 210 updates the graph 306 by modifying the one or more connections among the first through sixth clusters 304A-304F. In another embodiment, the graph generator 210 updates the graph 306 by modifying the one or more connections among the first through sixth clusters 304A-304F based on the variations in traffic intensity at different time intervals of a day. As traffic intensity is not static throughout the day and effects the travel time among the first through sixth clusters 304A-304F, the graph generator 210 monitors the traffic intensity to determine the travel time among the first through sixth clusters 304A-304F. The graph generator 210 further updates the graph 306 based on variations in the travel time. Thus, the first through sixth clusters 304A-304F may be connected differently under different traffic conditions, which makes the graph 306 dynamically adaptable. In yet another embodiment, the graph generator 210 may generate one or more graphs similar to the graph 306 for different time intervals of a day, based on variations in the travel time among the first through sixth clusters 304A-304F during different time intervals of the day. For example, during rush hours of a day the travel time among the first through sixth clusters 304A-304F may be greater in comparison to non-rush hours of the day. Thus, the graph generator 210 divides each day into multiple time buckets and generates a separate graph for each time bucket. In yet another embodiment, the graph generator 210 may generate separate graphs for different days of a week.

Figure 3C:
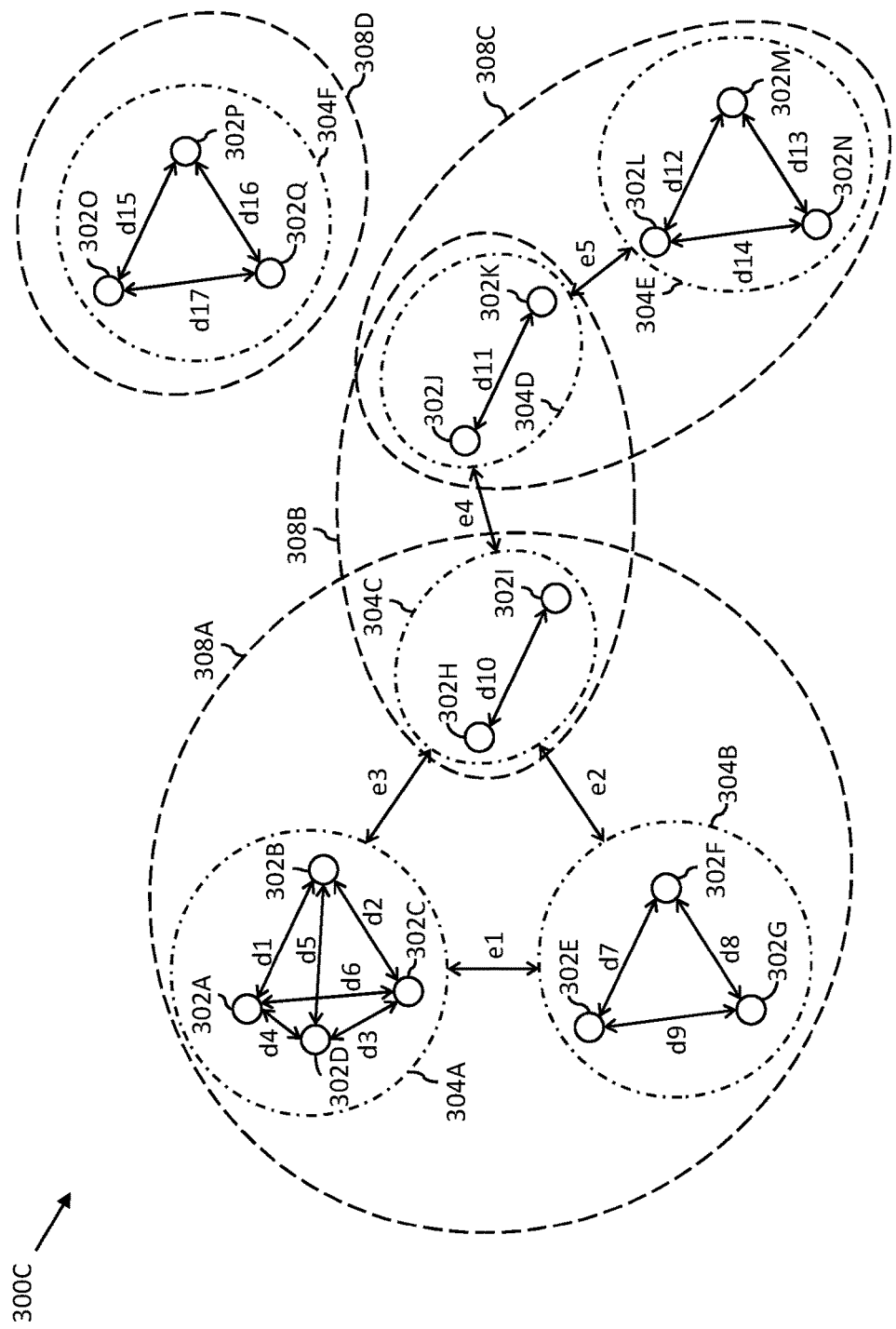
FIG. 3C is a block diagram of an exemplary scenario that illustrates formation of a plurality of fully-connected maximal sub-graphs from the graph of FIG. 3B in accordance with an embodiment of the present invention.

Referring now to FIG. 3C, a block diagram of an exemplary scenario 300C that illustrates formation of the plurality of fully-connected maximal sub-graphs from the graph 306 of FIG. 3B, in accordance with an embodiment of the present invention, is shown.

The segmentation engine 212 receives the graph 306 from the graph generator 210. The segmentation engine 212 segments the graph 306 to generate the plurality of sub-graphs, such as first through fourth sub-graphs 308A-308D. The segmentation engine 212 segments the graph 306 based on the one or more connections among the first through sixth clusters 304A-304F. The segmentation engine 212 groups a set of clusters that are directly connected to one another in one sub-graph. For example, the first through third clusters 304A-304C (i.e., a first set of clusters) are directly connected to one another by way of the first through third edges e1-e3. Hence, the segmentation engine 212 groups the first through third clusters 304A-304C in the first sub-graph 308A. As further shown in FIG. 3C, the second sub-graph 308B includes a second set of clusters having the third and fourth clusters 304C and 304D. The third and fourth clusters 304C and 304D are directly connected to one another by way of the fourth edge e4. The third sub-graph 308C includes a third set of clusters having the fourth and fifth clusters 304D and 304E. The fourth and fifth clusters 304D and 304E are directly connected to one another by way of the fifth edge e5. The fourth sub-graph 308D includes a fourth set of clusters, i.e., the sixth cluster 304F. Since the sixth cluster 304F is not directly connected to any other cluster, the fourth sub-graph 308D includes only one cluster, i.e., the sixth cluster 304F. Alternatively stated, each cluster in a set of clusters, such as the first through fourth sets of clusters, of a sub-graph, such as the first through fourth sub-graphs 308A-308D, is directly connected to the remaining clusters in the set of clusters.

The segmentation engine 212 segments the graph 306 in such a way that one or more sub-graphs of the first through fourth sub-graphs 308A-308D have one or more common clusters. As shown in FIG. 3C, the first and second sets of clusters of the first and second sub-graphs 308A and 308B, respectively, have a first set of common clusters, which includes the third cluster 304C. Further, the second and third sets of clusters of the second and third sub-graphs 308B and 308C, respectively, have a second set of common clusters, which includes the fourth cluster 304D. Further, the fourth sub-graph 308D does not have any cluster in common with any other cluster.

The tagging engine 214 receives the first through fourth sub-graphs 308A-308D from the segmentation engine 212. The tagging engine 214 tags each of the first through fourth sub-graphs 308A-308D based on the cluster type of each cluster included in the corresponding set of clusters. For example, the tagging engine 214 tags the first sub-graph 308A based on the cluster type of the first through third clusters 304A-304C included in the first set of clusters.

In one exemplary scenario, for tagging the first sub-graph 308A, the tagging engine 214 identifies the cluster type of each of the first through third clusters 304A-304C included in the first set of clusters. The tagging engine 214 identifies that the first and second clusters 304A and 304B has the residential cluster type and the third cluster 304C has the commercial cluster type. In such a scenario, the tagging engine 214 tags the first sub-graph 308A with the cluster type associated with the majority of clusters in the first set of clusters. Thus, the tagging engine 214 tags the first sub-graph 308A with the residential cluster type. Similarly, the tagging engine 214 tags the second through fourth sub-graphs 308B-308D.

In another exemplary scenario, for tagging the first sub-graph 308A, the tagging engine 214 identifies a weight associated with the cluster type of each of the first through third clusters 304A-304C included in the first set of clusters. The transportation service provider may have assigned the weights to each of the cluster types. For example, the transportation service provider may assign a weight of 0.4 to the residential cluster type, a weight of 0.3 to the official cluster type, a weight of 0.1 to the transit point cluster type, and a weight of 0.2 to the public cluster type. Thus, the tagging engine 214 gives precedence to the cluster type that has higher weight while tagging the first sub-graph 308A. For example, the tagging engine 214 identifies that the first cluster 304A has the official cluster type, the second cluster 304B has the public cluster type, and the third cluster 304C has the residential cluster type. Thus, the tagging engine 214 tags the first sub-graph 308A with the residential cluster type as the residential cluster type has the highest weight of 0.5 among the different cluster types. Similarly, the tagging engine 214 tags the second through fourth sub-graphs 308B-308D. The tagging engine 214 then stores the tagged first through fourth sub-graphs 308A-308D in the memory 204 and/or the database server 102.

It will be apparent to a person skilled in the art that the abovementioned exemplary scenarios are for illustrative purpose and should not be construed to limit the scope of the invention. In another embodiment, the tagging engine 214 may utilize one or more other tagging techniques known in the art to tag the first through fourth sub-graphs 308A-308D.

The predictor engine 216 further utilizes the first through fourth sub-graphs 308A-308D to predict the demand for the vehicles, such as the vehicle 112, originating from the first through fourth sub-graphs 308A-308D. The predictor engine 216 may utilize the historical travel data of the commuters 108 to predict the demand for the vehicles. The predictor engine 216 may further utilize the first through fourth sub-graphs 308A-308D to determine an accurate location of the vehicles, such as the vehicle 112. Further, based on the travel time associated with each of the first through fourth sub-graphs 308A-308D and the accurate location of the vehicles, the predictor engine 216 predicts by when a vehicle may be available to serve a transportation service request originating from one of the first through fourth sub-graphs 308A-308D. For example, currently the first commuter 108A may be travelling in the vehicle 112 from the first cluster 304A to the third cluster 304C of the first sub-graph 308A. Thus, based on the travel time, such as 12 minutes, between the first cluster 304A and the third cluster 304C, the predictor engine 216 predicts that after 12 minutes the vehicle 112 may become available to serve any other transportation service request originating from both the first and second sub-graphs 308A and 308B, since the drop-off point of the first commuter 108A lies in the common cluster of the first and second sub-graphs 308A and 308B. The predictor engine 216 may utilize various demand and supply forecasting algorithms known in the art to predict the demand and availability for/of the vehicles.

The one or more connections among the first through sixth clusters 304A-304F of the graph 306 are based on the distance and travel time thresholds, which make the one or more connections dynamically adaptable. For example, under different traffic conditions, the first through sixth clusters 304A-304F may be connected differently. Since the first through fourth sub-graphs 308A-308D are generated based on the one or more connections among the first through sixth clusters 304A-304F, the first through fourth sub-graphs 308A-308D are also dynamically adaptable. Since the application server 104 utilizes travel time as one of the threshold parameters for connecting the first through sixth clusters 304A-304F, each of the first through fourth sub-graphs 308A-308D includes the clusters that are directly reachable from one another within the travel time threshold. Thus, the corresponding set of clusters of each of the first through fourth sub-graphs 308A-308D behave identically in different traffic conditions. Further, the processing overhead of the application server 104 is reduced many folds by utilizing the first through fourth sub-graphs 308A-308D for performing the one or more transportation service operations as compared to the use of latitude-longitude coordinates. The first through fourth sub-graphs 308A-308D further have the set of common clusters among them, which eliminates the hard boundaries on allocation of the vehicles, thereby optimizing the transportation service vehicle allocation. An example of the allocation of the vehicle 112 by using the first through fourth sub-graphs 308A-308D is explained in detail in conjunction with FIG. 4.

Figure 4:
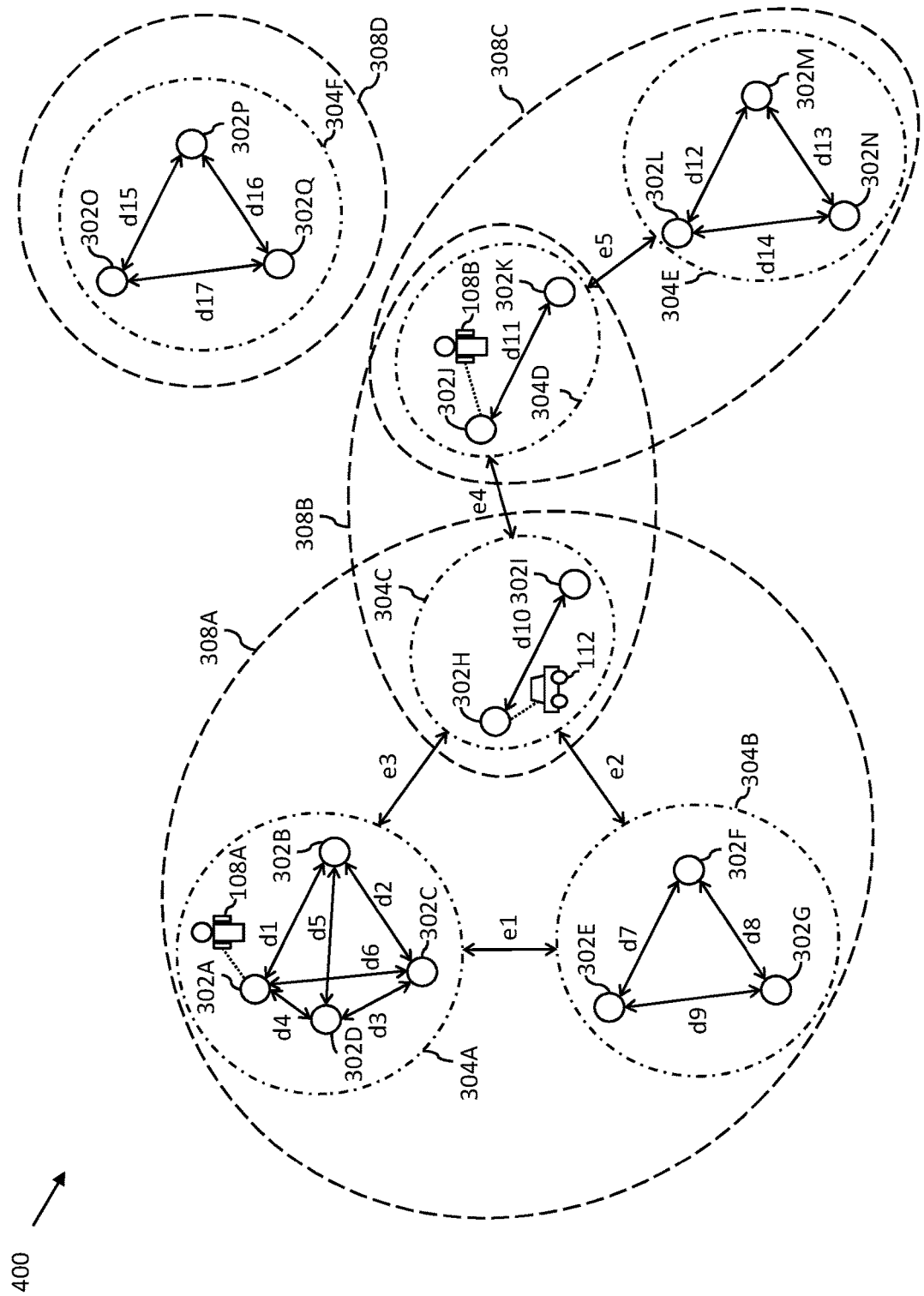
FIG. 4 is a block diagram of an exemplary scenario that illustrates allocation of a transportation service vehicle to a commuter by using the plurality of fully-connected maximal sub-graphs of FIG. 3C in accordance with an embodiment of the present invention.

Referring now to FIG. 4, a block diagram of an exemplary scenario 400 that illustrates allocation of the vehicle 112 to a commuter by using the plurality of fully-connected connected maximal sub-graphs of FIG. 3C, in accordance with an embodiment of the present invention, is shown. The exemplary scenario 400 illustrates the first through fourth sub-graphs 308A-308D, the first and second commuters 108A and 108B, and the vehicle 112.

The first commuter 108A raises a first transportation service request for travelling between the first and eighth locations 302A and 302H by using the first commuter-computing device 106A. The second commuter 108B raises a second transportation service request for travelling between the tenth and thirteenth locations 302J and 302M by using the second commuter-computing device 106B. The transceiver 206 receives the first and second transportation service requests from the first and second commuter-computing devices 106A and 106B via the communication network 114. The processor 202 processes the first and second transportation service requests and retrieves the first through fourth sub-graphs 308A-308D from the database server 102 and/or the memory 204.

Based on the first through fourth sub-graphs 308A-308D, the processor 202 determines that the first transportation service request has been raised from the first cluster 304A of the first sub-graph 308A. The processor 202 further determines that the second transportation service request has been raised from a common cluster, i.e., the fourth cluster 304D, of the second and third sub-graphs 308B and 308C. Thus, the processor 202 instructs the vehicle allocation engine 218 to identify one or more vehicles that are currently located in the first through third sub-graphs 308A-308C.

The vehicle allocation engine 218 determines that the vehicle 112, which is currently located at the eighth location 302H, is available for serving a transportation service request. The vehicle allocation engine 218 further determines that the eighth location 302H is encompassed by both the first and second sub-graphs 308A and 308B. Since the vehicle 112 is located in a cluster that is common to both the first and second sub-graphs 308A and 308B, the vehicle allocation engine 218 identifies the vehicle 112 to be available for serving the first and second transportation service requests that have been raised from both the first and second sub-graphs 308A and 308B. Thus, the vehicle allocation engine 218 can allocate the vehicle 112 to one of the first and second sub-graphs 308A and 308B to serve one of the first and second transportation service requests of the first and second commuters 108A and 108B, respectively.

In one embodiment, the vehicle allocation engine 218 allocates the vehicle 112 to serve that transportation service request for which an estimated arrival time of the vehicle 112 is less. For example, the vehicle allocation engine 218 determines that the estimated arrival time for the vehicle 112 to reach the first location 302A is 12 minutes and the estimated arrival time for the vehicle 112 to reach the tenth location 302J is 15 minutes. Hence, the vehicle allocation engine 218 allocates the vehicle 112 to the first sub-graph 308A to serve the first transportation service request of the first commuter 108A.

In another embodiment, the vehicle allocation engine 218 allocates the vehicle 112 to serve that transportation service request for which the travel distance is less. For example, the vehicle allocation engine 218 determines that the vehicle 112 has to travel 700 m to reach the first location 302A and 600 m to reach the tenth location 302J, from its current location, i.e., the eighth location 302H. Hence, the vehicle allocation engine 218 allocates the vehicle 112 to the second sub-graph 308B to serve the second transportation service request of the second commuter 108B.

In yet another embodiment, the vehicle allocation engine 218 may allocate the vehicle 112 based on an input from a driver (not shown) of the vehicle 112. For example, the vehicle allocation engine 218 communicates both the first and second transportation service requests to the driver of the vehicle 112. The driver selects to serve the first transportation service request and communicates the selection to the vehicle allocation engine 218 by using the vehicle-computing device 110. Thus, the vehicle allocation engine 218 allocates the vehicle 112 to the first sub-graph 308A to serve the first transportation service request of the first commuter 108A. In one embodiment, the vehicle allocation engine 218 generates and transmits a pick-up notification to the vehicle-computing device 110 by way of the transceiver 206. The pick-up notification indicates a pick-up location to the driver of the vehicle 112 from where the first commuter 108A is to be picked-up. The vehicle allocation engine 218 further generates and transmits a booking notification to the first commuter-computing device 106A by way of the transceiver 206. The booking notification indicates the first commuter 108A that the vehicle 112 is booked to serve the first transportation service request. The booking notification further indicates an estimated arrival time of the vehicle 112 to reach the first location 302A (i.e., the pick-up location) and details of the vehicle 112. The details may include a name of the driver, a vehicle identification number of the vehicle 112, and the like. Further, the vehicle allocation engine 218 identifies another vehicle to serve the second transportation service request of the second commuter 108B.

It will be apparent to a person skilled in the art that the allocation of the vehicle 112 to one of the first and second sub-graphs 308A and 308B is not limited to the abovementioned embodiments.

In one embodiment, the vehicle allocation engine 218 may utilize the first through fourth sub-graphs 308A-308D to serve one or more ride-share service requests. The vehicle allocation engine 218 may allocate the vehicle 112 to serve multiple ride-share service requests that are raised from a sub-graph where the vehicle 112 is currently located. For example, the first and third commuters 108A and 108C raise first and second ride-share service requests from the first and second clusters 304A and 304B, respectively, and the vehicle 112 is located in the third cluster 304C. Since the first through third clusters 304A-304C are included in the first sub-graph 308A, the vehicle allocation engine 218 allocates the vehicle 112 to be shared between the first and third commuters 108A and 108C.

In a scenario, when the vehicle 112 is located in a cluster that is common to the one or more sub-graphs, the vehicle allocation engine 218 may allocate the vehicle 112 to serve the ride-share service requests that are raised from the one or more sub-graphs that share the common cluster. For example, the first and second commuters 108A and 108B raise first and third ride-share service requests from the first and fourth clusters 304A and 304D, respectively, and the vehicle 112 is located in the third cluster 304C. Since the vehicle 112 is located in the third cluster 304C that is common to the first and second sub-graphs 308A and 308B including the first and fourth clusters 304A and 304D, respectively, the vehicle allocation engine 218 allocates the vehicle 112 to be shared between the first and second commuters 108A and 108B. Thus, the application server 104 utilizes the first through fourth sub-graphs 308A-308D to optimize the one or more transportation service operations, such as the transportation service vehicle allocation.

Figure 5:
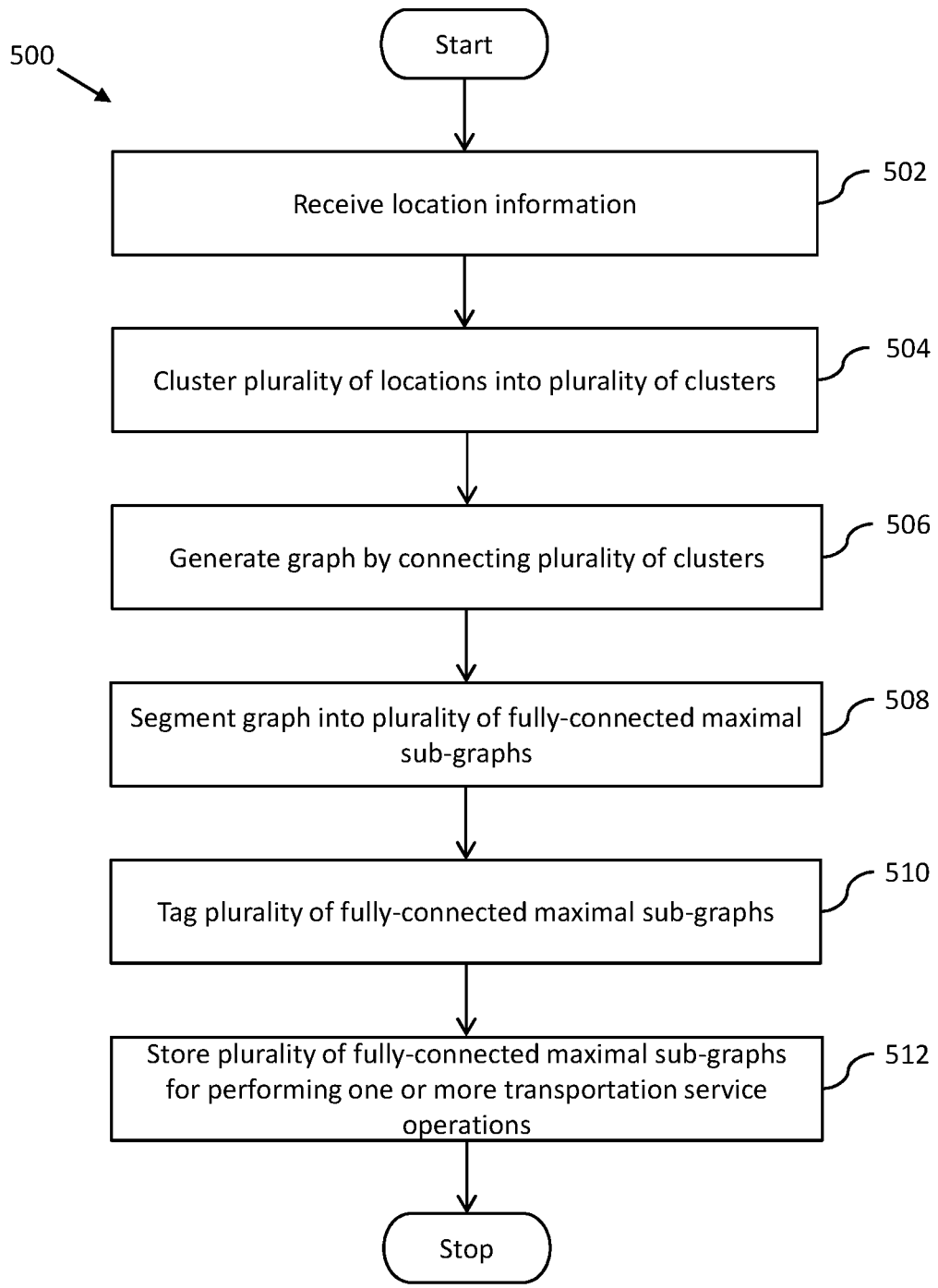
FIG. 5 is a flow chart that illustrates a method for location clustering for a transportation service in the environment of FIG. 1 in accordance with an embodiment of the present invention.

Referring now to FIG. 5, a flow chart 500 that illustrates a method for location clustering for a transportation service in the environment 100 of FIG. 1, in accordance with an embodiment of the present invention, is shown.

At step 502, the processor 202 receives the location information pertaining to the plurality of locations, such as the first through seventeenth locations 302A-302Q, of the geographical area. In one embodiment, the processor 202 receives the location information from the database server 102 over the communication network 114. In another embodiment, the processor 202 receives the location information from the commuter-computing devices 106 over the communication network 114.

At step 504, the clustering engine 208 clusters the plurality of locations into the plurality of clusters, such as the first through sixth clusters 304A-304F. The one or more locations in each of the plurality of clusters are different. The clustering engine 208 further determines the cluster type for each of the plurality of clusters based on the one or more locations in each of the plurality of clusters. At step 506, the graph generator 210 generates the graph 306 by connecting the plurality of clusters based on the one or more threshold parameters. The one or more threshold parameters include the distance and travel time thresholds.

At step 508, the segmentation engine 212 segments the graph 306 into the plurality of sub-graphs, such as the first through fourth sub-graphs 308A-308D. Each of the plurality of sub-graphs includes a corresponding set of clusters. For example, the first through fourth sub-graphs 308A-308D include the first through fourth sets of clusters, respectively. Each cluster in the set of clusters of each sub-graph is connected to the remaining clusters in the set of clusters. In one embodiment, one or more sub-graphs among the first through fourth sub-graphs 308A-308D may have the set of common clusters therebetween. At step 510, the tagging engine 214 tags the plurality of sub-graphs, such as the first through fourth sub-graphs 308A-308D, based on the cluster type of each cluster in the corresponding set of clusters.

At step 512, the processor 202 stores the plurality of sub-graphs, such as the first through fourth sub-graphs 308A-308D, in a storage server, such as the memory 204 and/or the database server 102, for performing the one or more transportation service operations. A transportation service operation of the one or more transportation service operations performed by utilizing the plurality of sub-graphs is explained in conjunction with FIG. 6.

Figure 6:
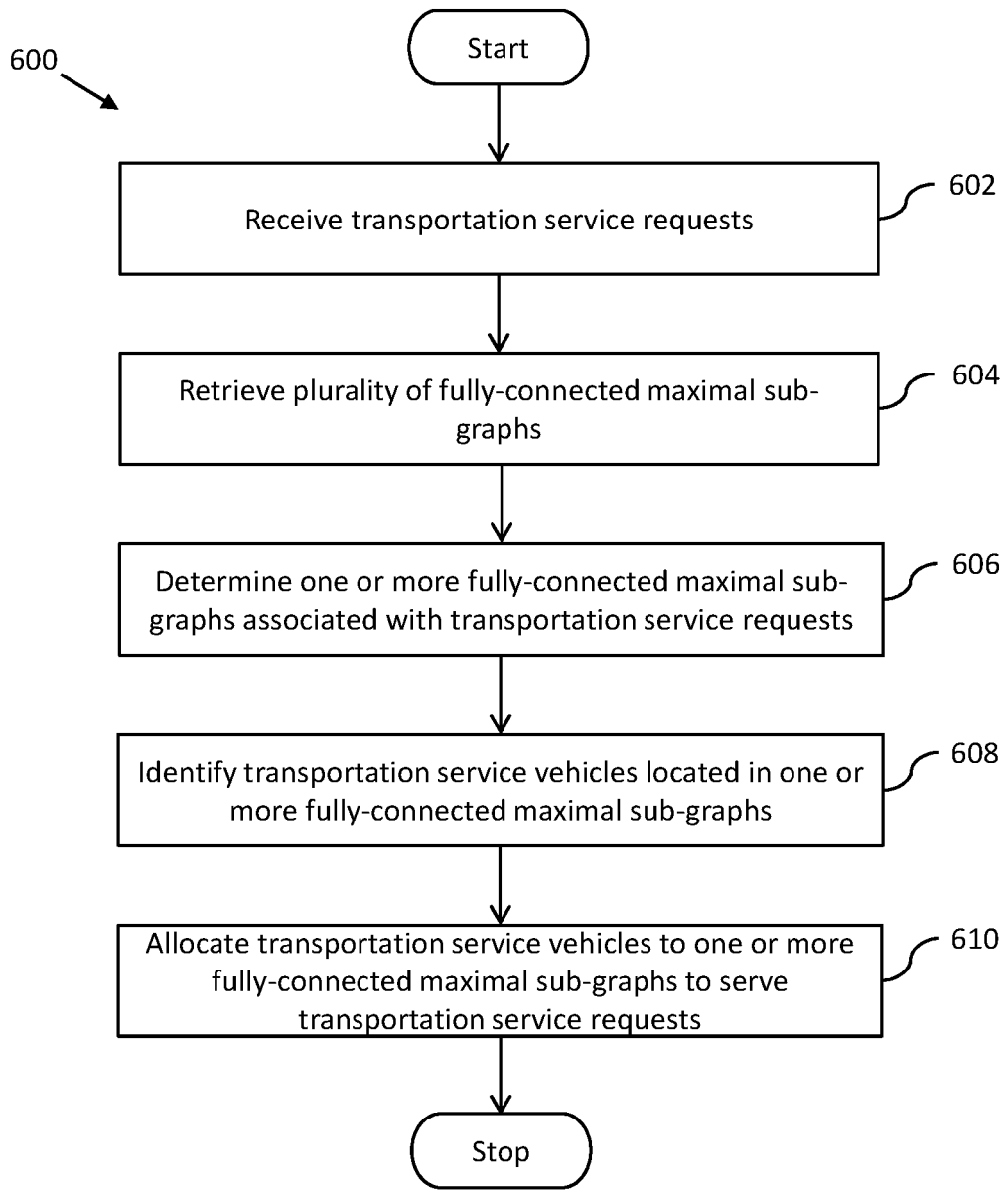
FIG. 6 is a flow chart that illustrates allocation of a transportation service vehicle to a fully-connected maximal sub-graph of a plurality of fully-connected maximal sub-graphs in the environment of FIG. 1 in accordance with an embodiment of the present invention.

Referring now to FIG. 6, a flow chart 600 that illustrates allocation of the vehicle 112 to a fully-connected maximal sub-graph of the plurality of fully-connected maximal sub-graphs, i.e., the first through fourth sub-graphs 308A-308D, in the environment 100 of FIG. 1, in accordance with an embodiment of the present invention, is shown.

At step 602, the processor 202, in conjunction with the transceiver 206, receives the transportation service requests of the commuters 108. At step 604, the processor 202 retrieves the plurality of sub-graphs, i.e., the first through fourth sub-graphs 308A-308D, from the database server 102 and/or the memory 204, based on the transportation service requests.

At step 606, the processor 202 determines one or more sub-graphs of the first through fourth sub-graphs 308A-308D that are associated with the transportation service requests. At step 608, the vehicle allocation engine 218 identifies the vehicles, such as the vehicle 112, that are located in the one or more sub-graphs associated with the transportation service requests.

At step 610, the vehicle allocation engine 218 allocates the vehicles to the one or more sub-graphs to serve the transportation service requests. In a scenario, the vehicle 112 may be located in a cluster, such as the third and fourth clusters 304C and 304D, which is common to the one or more sub-graphs. In such a scenario, the vehicle allocation engine 218 allocates the vehicle 112 to one of the one or more sub-graphs. Conversely, the vehicle 112 may be located in a cluster, such as the first, second, fifth, and sixth clusters 304A, 304B, 304E, and 304F, which is not common to the one or more sub-graphs. In such a scenario, the vehicle allocation engine 218 allocates the vehicle 112 to the sub-graph that includes the cluster where the vehicle 112 is currently located.

Figure 7:
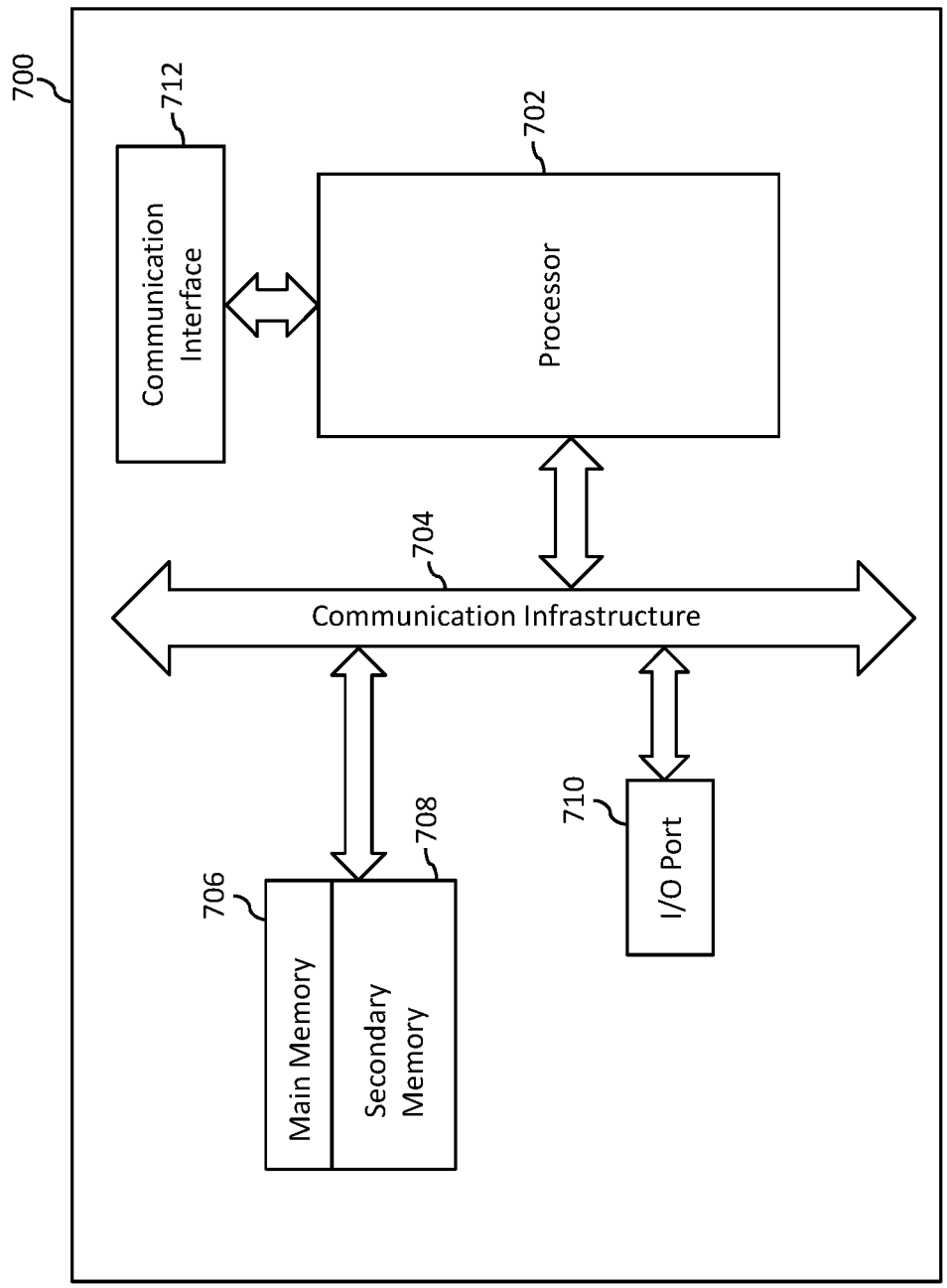
FIG. 7 is a block diagram that illustrates a computer system for location clustering for a transportation service in the environment of FIG. 1 in accordance with an embodiment of the present invention.

Referring now to FIG. 7, a block diagram that illustrates a computer system 700 for location clustering is shown, in accordance with an embodiment of the present invention. An embodiment of the present invention, or portions thereof, may be implemented as computer readable code on the computer system 700. In one example, the database server 102 and the application server 104 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5 and 6.

The computer system 700 includes a processor 702 that may be a special purpose or a general purpose processing device. The processor 702 may be a single processor, multiple processors, or combinations thereof. The processor 702 may have one or more processor "cores." Further, the processor 702 may be connected to a communication infrastructure 704, such as a bus, a bridge, a message queue, the communication network 114, multi-core message-passing scheme, and the like. The computer system 700 further includes a main memory 706 and a secondary memory 708. Examples of the main memory 706 may include random access memory (RAM), read-only memory (ROM), and the like. The secondary memory 708 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 700 further includes an input/output (I/O) port 710 and a communication interface 712. The I/O port 710 includes various input and output devices that are configured to communicate with the processor 702. Examples of the input devices may include a keyboard, a mouse, a joystick, a touch-screen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communications port, and the like. Data transferred via the communication interface 712 may be signals, such as electronic, electromagnetic, optical, or other signals as will be apparent to a person skilled in the art. The signals may travel via a communications channel, such as the communication network 114 which may be configured to transmit the signals to the various devices that are communicatively coupled to the computer system 700. Examples of the communication channel may include, but are not limited to, cable, fiber optics, a phone line, a cellular phone link, a radio frequency link, a wireless link, and the like.

Computer program medium and computer usable medium may refer to memories, such as the main memory 706 and the secondary memory 708, which may be a semiconductor memory such as dynamic RAMs. These computer program mediums may provide data that enables the computer system 700 to implement the methods illustrated in FIGS. 5 and 6. In an embodiment, the present invention is implemented using a computer implemented application. The computer implemented application may be stored in a computer program product and loaded into the computer system 700 using the removable storage drive or the hard disc drive in the secondary memory 708, the I/O port 710, or the communication interface 712.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 702, and a memory, such as the main memory 706 and the secondary memory 708, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Thus, the location clustering method implemented by the application server 104 to generate the plurality of sub-graphs, such as the first through fourth sub-graphs 308A-308D, reduces the processing overhead of the application server 104. The plurality of sub-graphs further offer a dynamically adaptable solution that optimizes the transportation service vehicle allocation as described in the foregoing.

Techniques consistent with the present invention provide, among other features, systems and methods for location clustering for a transportation service. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method comprising:
   clustering, by circuitry, a plurality of locations of a geographical area into a plurality of clusters based on one or more clustering parameters, wherein each cluster of the plurality of clusters includes one or more locations of the plurality of locations;
   generating, by the circuitry, a graph by connecting the plurality of clusters based on one or more threshold parameters, wherein a first cluster of the plurality of clusters is connected to one or more second clusters of the plurality of clusters that satisfy the one or more threshold parameters;
   segmenting, by the circuitry, the graph into a plurality of fully-connected maximal sub-graphs based on one or more connections between the plurality of clusters of the graph, wherein each fully-connected maximal sub-graph of the plurality of fully-connected maximal sub-graphs includes one or more clusters of the plurality of clusters, and wherein a first set of clusters of a first fully-connected maximal sub-graph of the plurality of fully-connected maximal sub-graphs and a second set of clusters of a second fully-connected maximal sub-graph of the plurality of fully-connected maximal sub-graphs have a set of common clusters therebetween; and
   storing, by the circuitry, the plurality of fully-connected maximal sub-graphs in a storage server for performing one or more transportation service operations of a transportation service.

2. The method of claim 1, further comprising receiving, by the circuitry, location information pertaining to the plurality of locations from the storage server.

3. The method of claim 1, further comprising receiving, by the circuitry, location information pertaining to the plurality of locations from a plurality of commuter-computing devices of a plurality of commuters, respectively.

4. The method of claim 1, wherein the plurality of locations includes one or more pick-up and drop-off locations of a plurality of commuters.

5. The method of claim 1, wherein a clustering parameter of the one or more clustering parameters is a clustering distance parameter, and wherein first and second locations of the plurality of locations are clustered into the first cluster, when a distance between the first and second locations is less than or equal to the clustering distance parameter.

6. The method of claim 1, wherein the one or more locations in each of the plurality of clusters are different.

7. The method of claim 1, wherein the one or more threshold parameters include:
   a distance threshold, wherein the first cluster is connected to the one or more second clusters that are within the distance threshold from the first cluster; and
   a travel time threshold, wherein the first cluster is connected to the one or more second clusters that are reachable from the first cluster within the travel time threshold.

8. The method of claim 1, further comprising updating, by the circuitry, the graph based on one or more updates associated with the one or more threshold parameters.

9. The method of claim 1, further comprising tagging, by the circuitry, each fully-connected maximal sub-graph of the plurality of fully-connected maximal sub-graphs, wherein each fully-connected maximal sub-graph is tagged based on a cluster type of each cluster that is included in the one or more clusters of the corresponding fully-connected maximal sub-graph.

10. The method of claim 9, wherein the cluster type is at least one of a residential cluster type, a commercial cluster type, a transit point cluster type, or a public cluster type.

11. The method of claim 1, wherein a transportation service operation of the one or more transportation service operations includes allocation of a transportation service vehicle to one of the first and second fully-connected maximal sub-graphs to serve one or more transportation service requests from one of the first set of clusters and the second set of clusters, when a current location of the transportation service vehicle is in a common cluster of the set of common clusters.

12. A system comprising:
    circuitry that is configured to:
       cluster a plurality of locations of a geographical area into a plurality of clusters based on one or more clustering parameters, wherein each cluster of the plurality of clusters includes one or more locations of the plurality of locations;
       generate a graph by connection of the plurality of clusters based on one or more threshold parameters, wherein a first cluster of the plurality of clusters is connected to one or more second clusters of the plurality of clusters that satisfy the one or more threshold parameters;
       segment the graph into a plurality of fully-connected maximal sub-graphs based on one or more connections between the plurality of clusters of the graph, wherein each fully-connected maximal sub-graph of the plurality of fully-connected maximal sub-graphs includes one or more clusters of the plurality of clusters, and wherein a first set of clusters of a first fully-connected maximal sub-graph of the plurality of fully-connected maximal sub-graphs and a second set of clusters of a second fully-connected maximal sub-graph of the plurality of fully-connected maximal subgraphs have a set of common clusters therebetween; and
       store the plurality of fully-connected maximal sub-graphs in a storage server to perform one or more transportation service operations of a transportation service.

13. The system of claim 12, wherein the circuitry is further configured to retrieve a geographical map of the geographical area from the storage server, and wherein the geographical map includes the plurality of locations of the geographical area.

14. The system of claim 12, wherein the circuitry is further configured to receive location information that pertains to the plurality of locations from a plurality of commuter-computing devices of a plurality of commuters, respectively.

15. The system of claim 12, wherein the plurality of locations includes one or more pick-up and drop-off locations of a plurality of commuters.

16. The system of claim 12, wherein a clustering parameter of the one or more clustering parameters is a clustering distance parameter, and wherein first and second locations of the plurality of locations are clustered into the first cluster, when a distance between the first and second locations is less than or equal to the clustering distance parameter.

17. The system of claim 12, wherein the one or more locations in each of the plurality of clusters are different.

18. The system of claim 12, wherein the one or more threshold parameters include:
a distance threshold, wherein the first cluster is connected to the one or more second clusters that are within the distance threshold from the first cluster; and
a travel time threshold, wherein the first cluster is connected to the one or more second clusters that are reachable from the first cluster within the travel time threshold.

19. The system of claim 12, wherein the circuitry is further configured to tag each fully-connected maximal sub-graph of the plurality of fully-connected maximal sub-graphs, wherein each fully-connected maximal sub-graph is tagged based on a cluster type of each cluster that is included in the one or more clusters of the corresponding fully-connected maximal sub-graph, and wherein the cluster type is at least one of a residential cluster type, a commercial cluster type, a transit point cluster type, or a public cluster type.

20. The system of claim 12, wherein a transportation service operation of the one or more transportation service operations includes allocation of a transportation service vehicle to one of the first and second fully-connected maximal sub-graphs to serve one or more transportation service requests from one of the first set of clusters and the second set of clusters, when a current location of the transportation service vehicle is in a common cluster of the set of common clusters.

* * * * *